(12) United States Patent
Lee et al.

(10) Patent No.: US 10,611,343 B2
(45) Date of Patent: Apr. 7, 2020

(54) WINDSHIELD WIPER ASSEMBLY

(71) Applicants: ALBEREE PRODUCTS, INC., Halethorpe, MD (US); API KOREA CO., LTD., Incheon (KR)

(72) Inventors: Albert Lee, Baltimore, MD (US); Choon Bae Lee, Incheon (KR)

(73) Assignees: ALBEREE PRODUCTS, INC., Halethorpe, MD (US); API KOREA CO., LTD., Incheon (KR)

( * ) Notice: Subject to any disclaimer, the term of this patent is extended or adjusted under 35 U.S.C. 154(b) by 86 days.

(21) Appl. No.: 15/567,014

(22) PCT Filed: Apr. 15, 2016

(86) PCT No.: PCT/KR2016/003939
§ 371 (c)(1),
(2) Date: Oct. 16, 2017

(87) PCT Pub. No.: WO2016/167597
PCT Pub. Date: Oct. 20, 2016

(65) Prior Publication Data
US 2018/0126957 A1   May 10, 2018

(30) Foreign Application Priority Data
Apr. 17, 2015  (KR) .................. 10-2015-0054739

(51) Int. Cl.
*B60S 1/38* (2006.01)
*B60S 1/40* (2006.01)

(52) U.S. Cl.
CPC ............... *B60S 1/387* (2013.01); *B60S 1/407* (2013.01); *B60S 1/4074* (2013.01); *B60S 1/3863* (2013.01)

(58) Field of Classification Search
CPC ........... B60S 1/407; B60S 1/40; B60S 1/3801
See application file for complete search history.

(56) References Cited

U.S. PATENT DOCUMENTS

| | | | | |
|---|---|---|---|---|
| 7,395,577 | B2 * | 7/2008 | Chiang | B60S 1/3848 15/250.32 |
| 8,752,234 | B2 * | 6/2014 | Ku | B60S 1/3801 15/250.31 |
| 8,973,207 | B2 * | 3/2015 | Depondt | B60S 1/387 15/250.001 |
| 9,108,594 | B2 * | 8/2015 | Kim | B60S 1/387 |
| 9,688,251 | B2 * | 6/2017 | Ku | B60S 1/3849 |
| 2006/0021179 | A1 * | 2/2006 | Yang | B60S 1/4003 15/250.32 |

(Continued)

FOREIGN PATENT DOCUMENTS

EP    2108552 A1   10/2009
KR    10-2013-0093136 A   8/2013

(Continued)

*Primary Examiner* — Michael D Jennings
(74) *Attorney, Agent, or Firm* — Birch, Stewart, Kolasch & Birch, LLP

(57) ABSTRACT

Disclosed herein is a windshield wiper assembly configured to be easily assembled to a driving arm equipped in a vehicle. In the windshield wiper assembly, an adaptor is provided with a first coupling part, into which a side pin protruding from the side surface of the driving arm is inserted, and a first entrance of the first coupling part, into which the side pin is inserted, is open upward.

14 Claims, 17 Drawing Sheets

(56) References Cited

U.S. PATENT DOCUMENTS

| | | | |
|---|---|---|---|
| 2013/0185890 A1 | 7/2013 | Ku | |
| 2013/0212825 A1* | 8/2013 | Lee | B60S 1/3867 |
| | | | 15/250.32 |
| 2014/0047662 A1 | 2/2014 | Depondt | |
| 2014/0068887 A1* | 3/2014 | Lee | B60S 1/3801 |
| | | | 15/250.32 |
| 2014/0230175 A1* | 8/2014 | Kim | B60S 1/387 |
| | | | 15/250.32 |
| 2015/0336541 A1 | 11/2015 | Boland | |
| 2016/0016549 A1* | 1/2016 | Gaucher | B60S 1/4074 |
| | | | 15/250.38 |

FOREIGN PATENT DOCUMENTS

| | | |
|---|---|---|
| KR | 10-2014-0036114 A | 3/2014 |
| KR | 10-2015-0033621 A | 4/2015 |

\* cited by examiner

[Fig. 1]
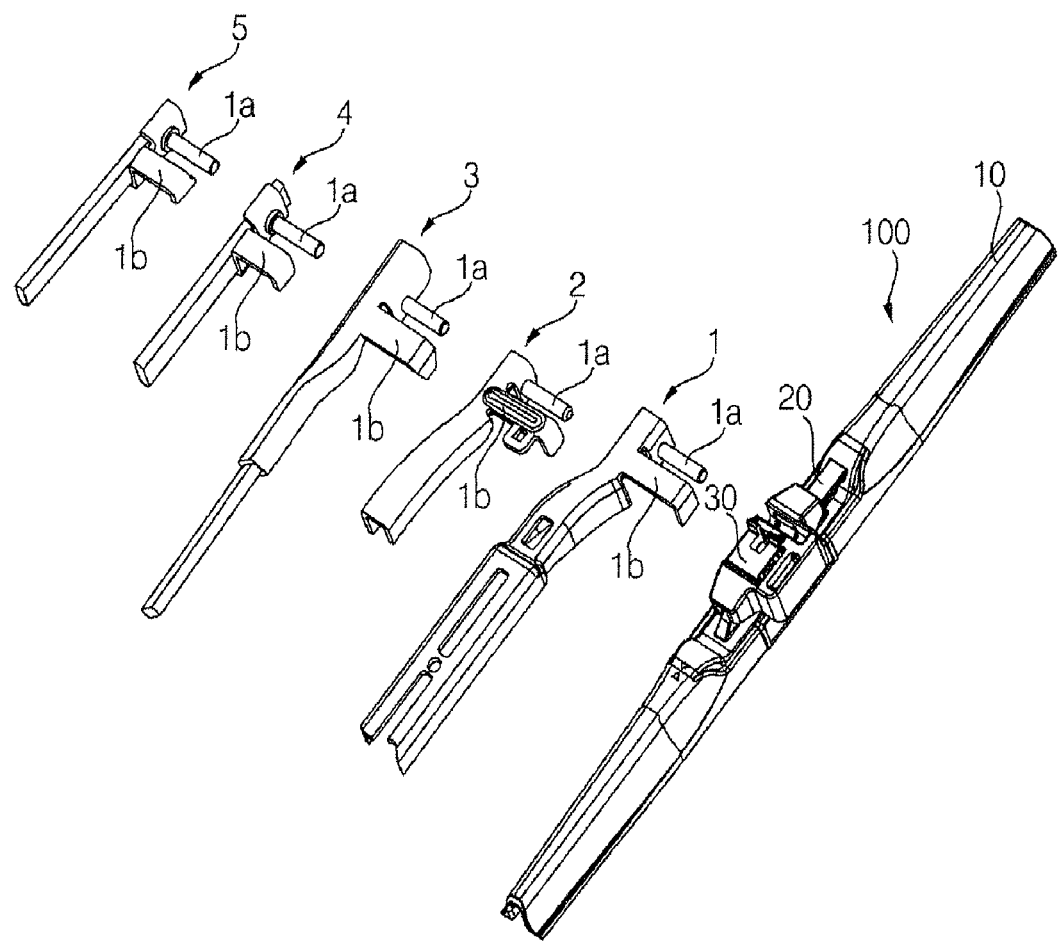

[Fig. 2a]
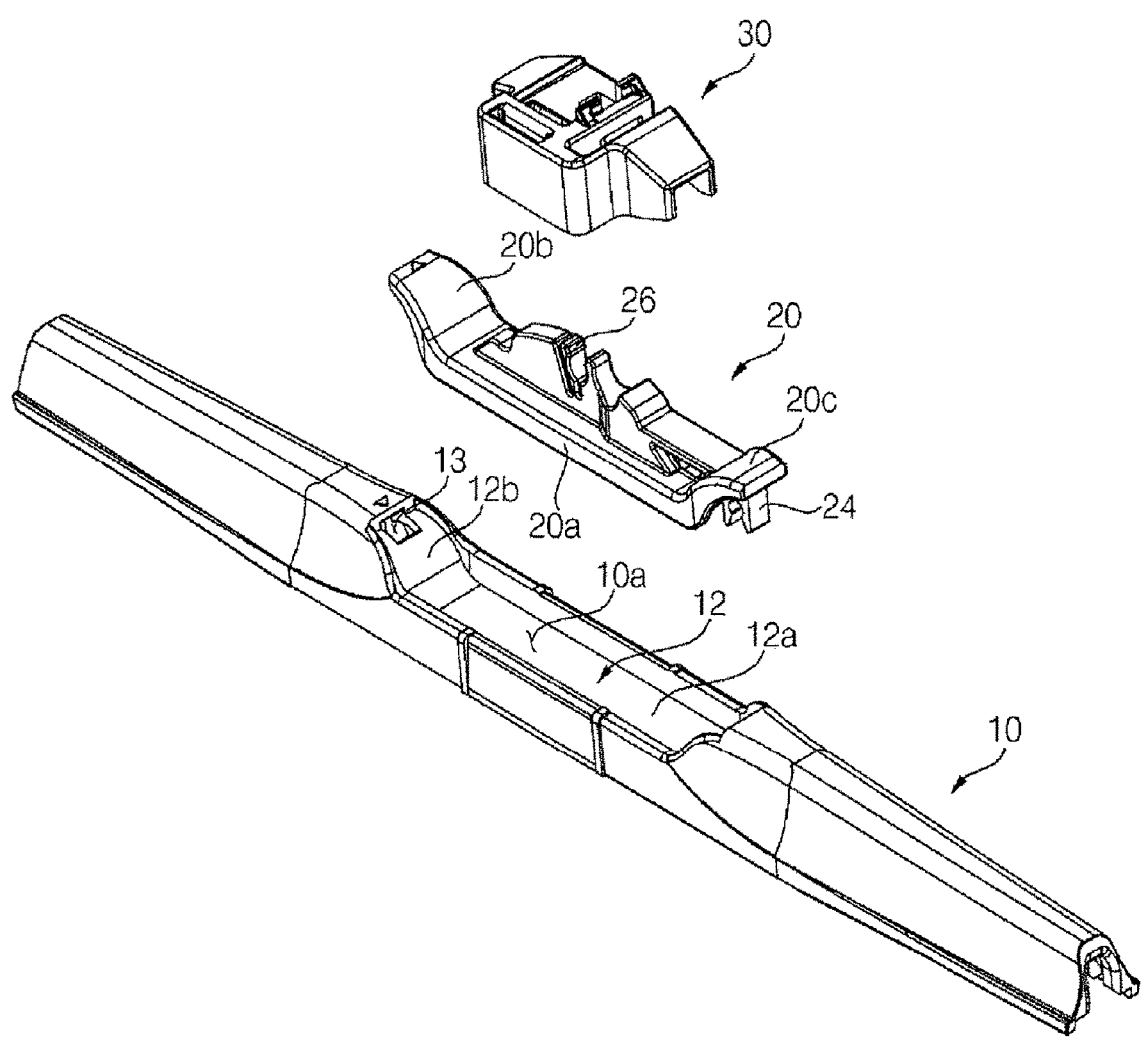

[Fig. 2b]
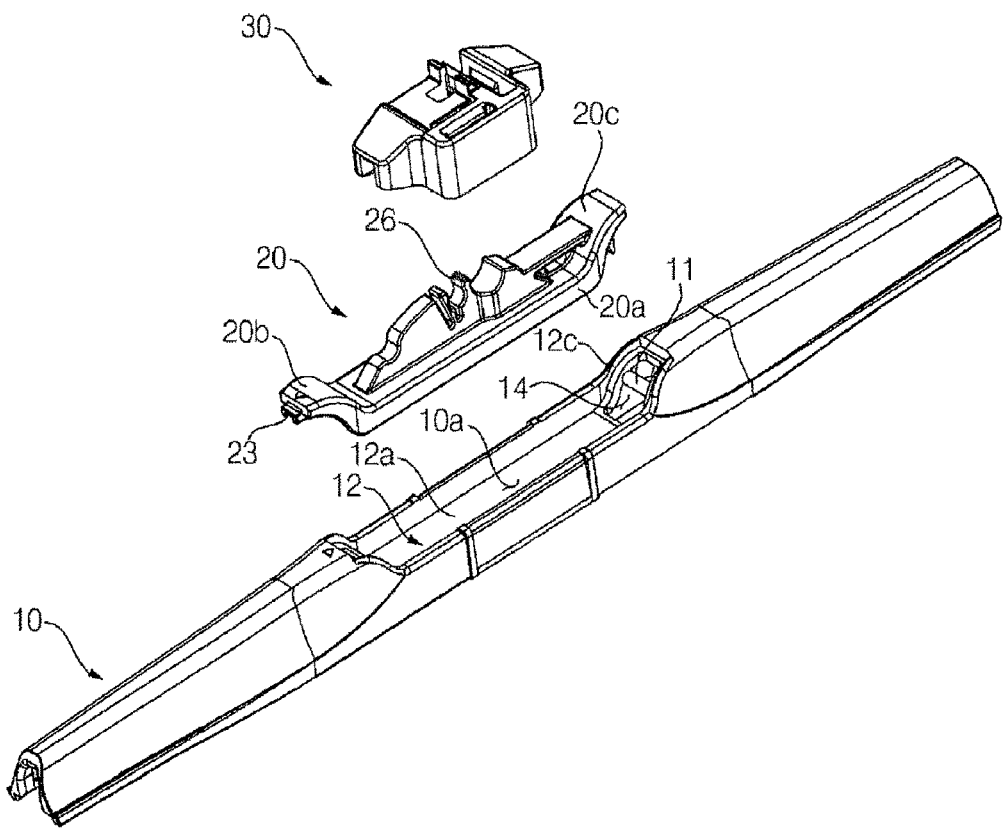
[Fig. 3]
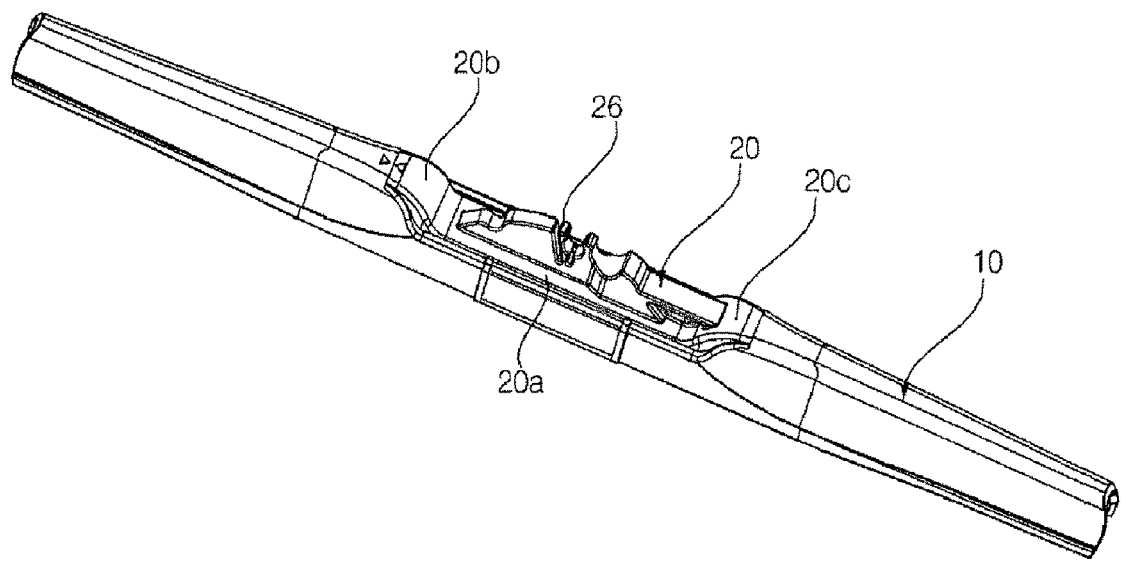

[Fig. 4a]
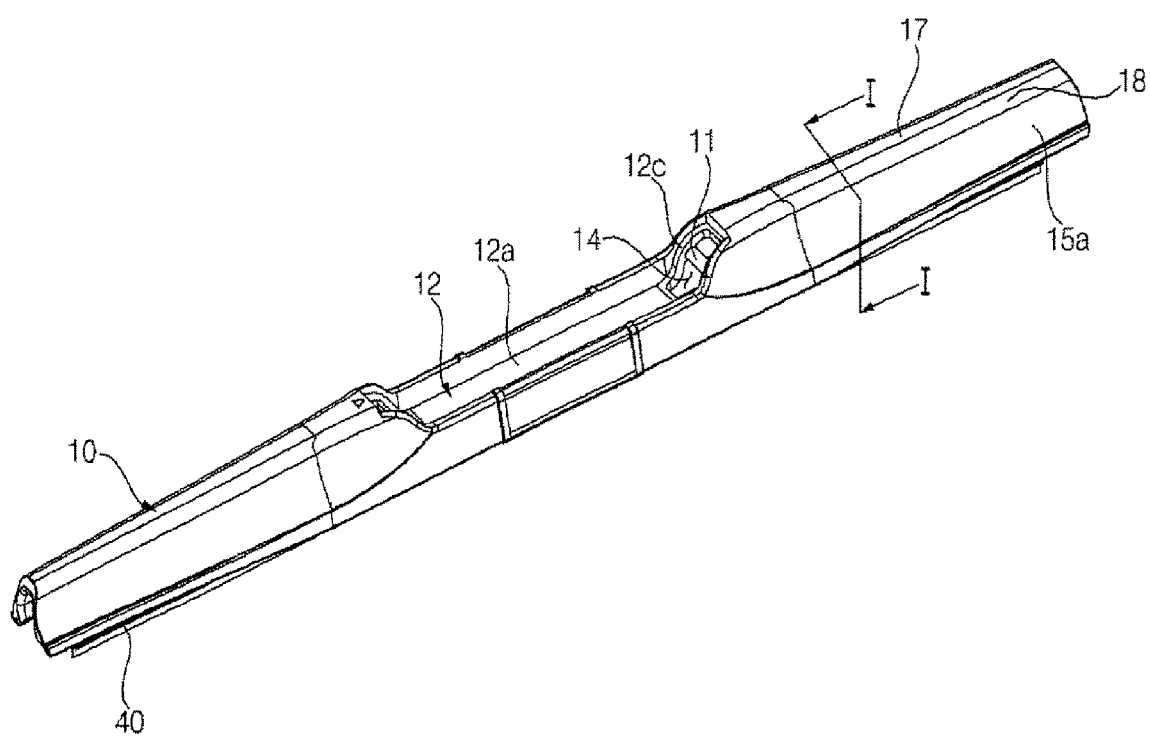

[Fig. 4b]
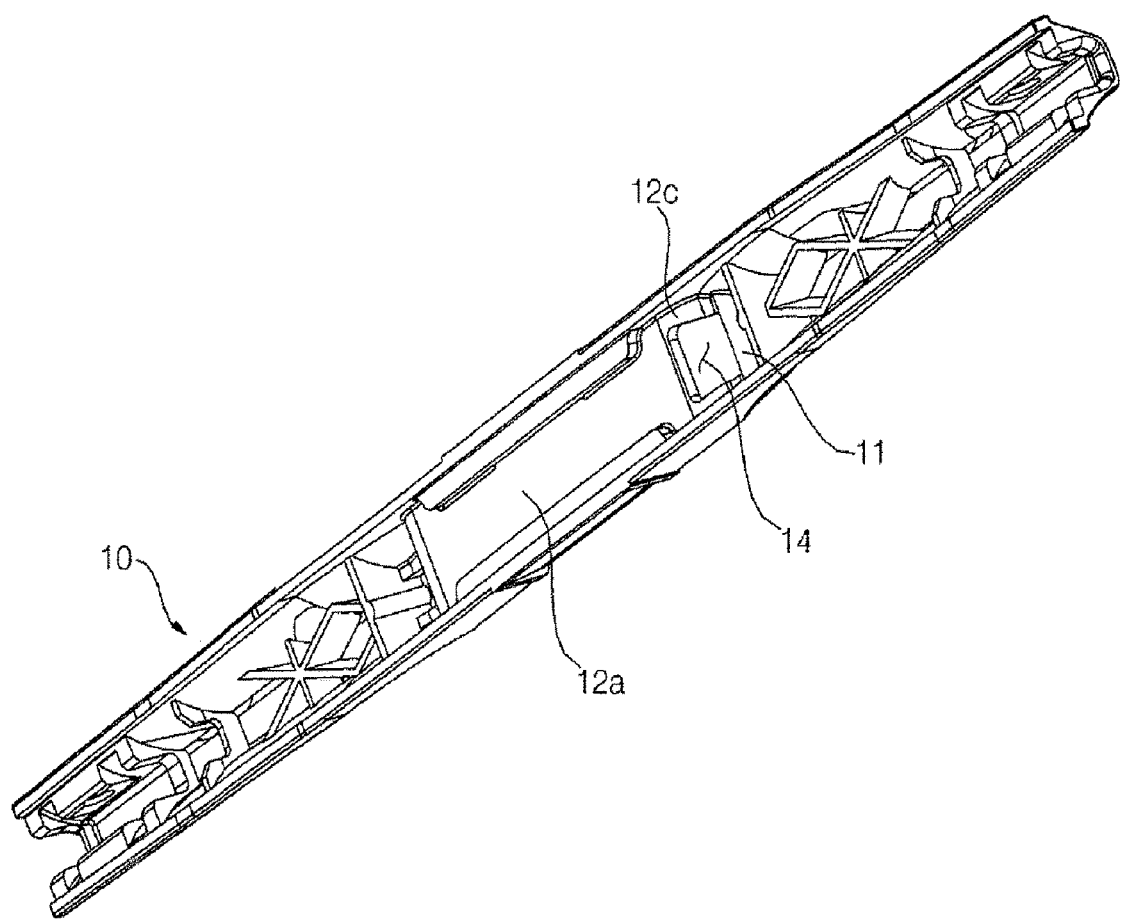

[Fig. 4c]
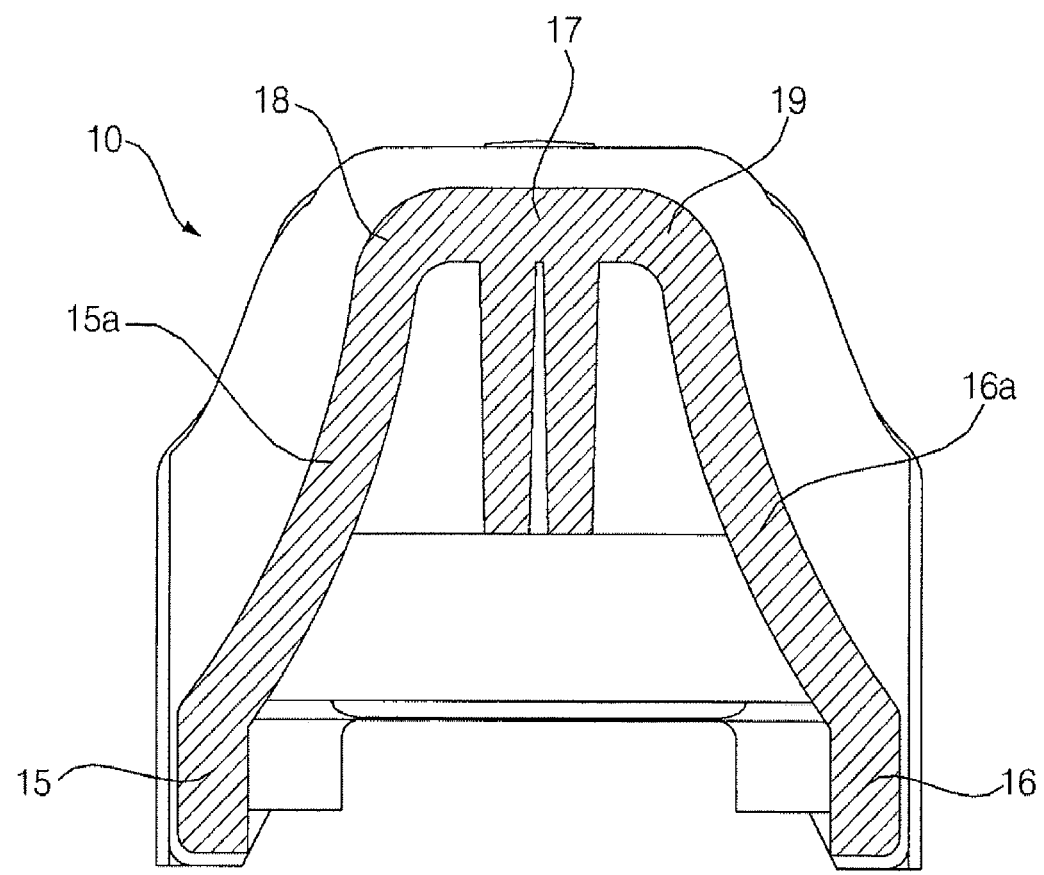

[Fig. 5a]
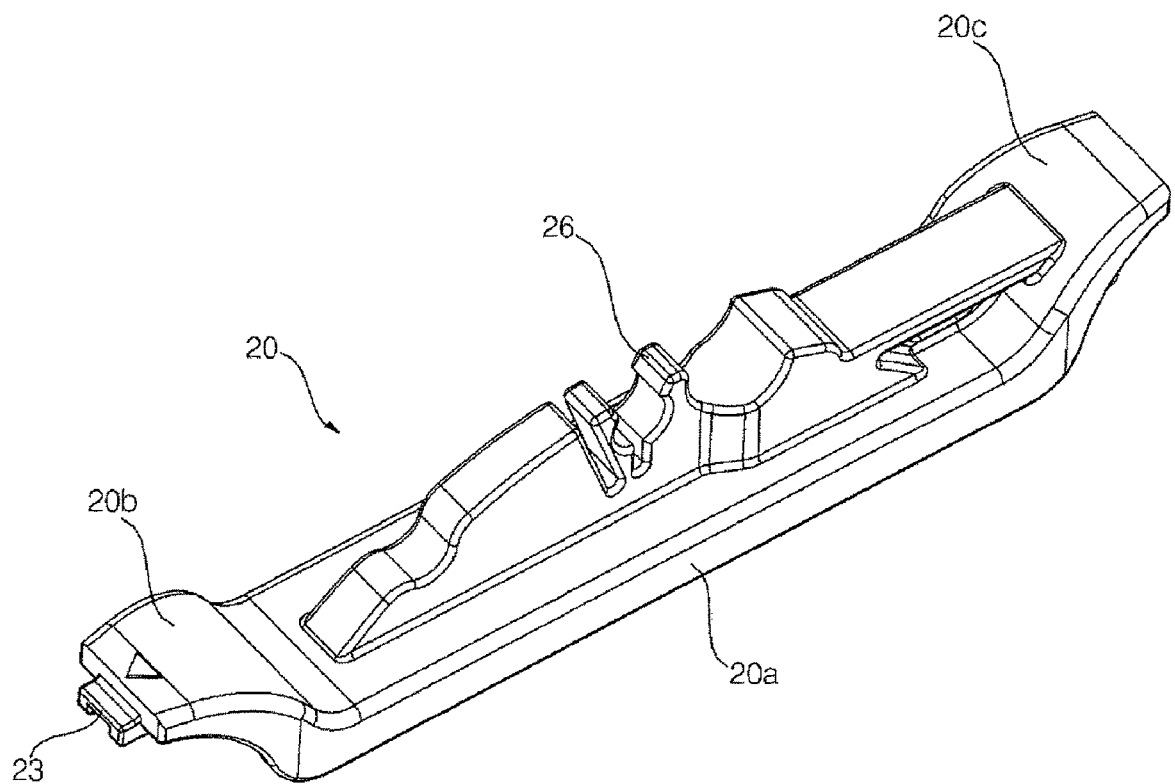
[Fig. 5b]
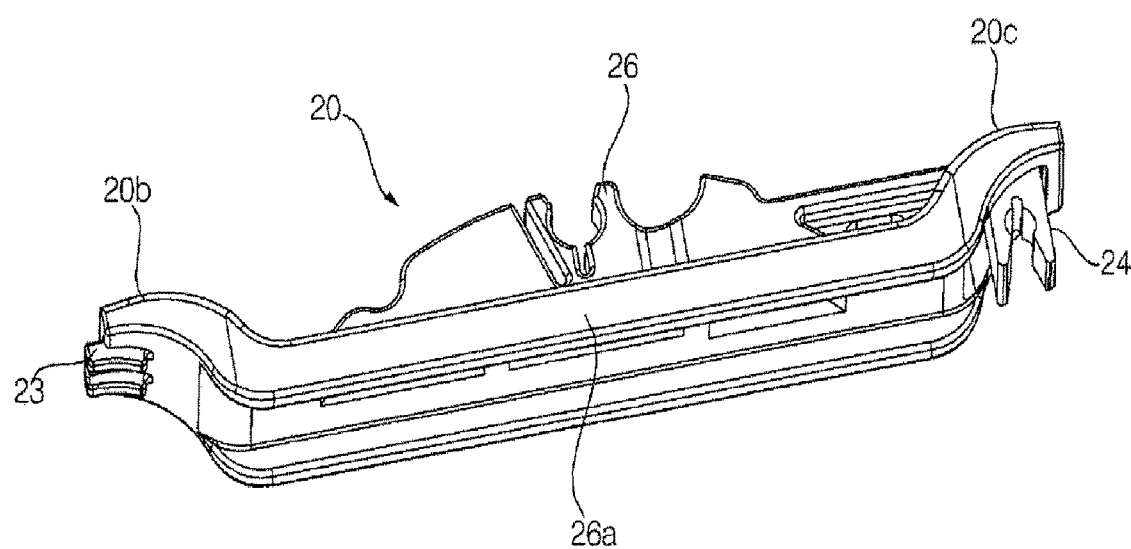

[Fig. 6a]
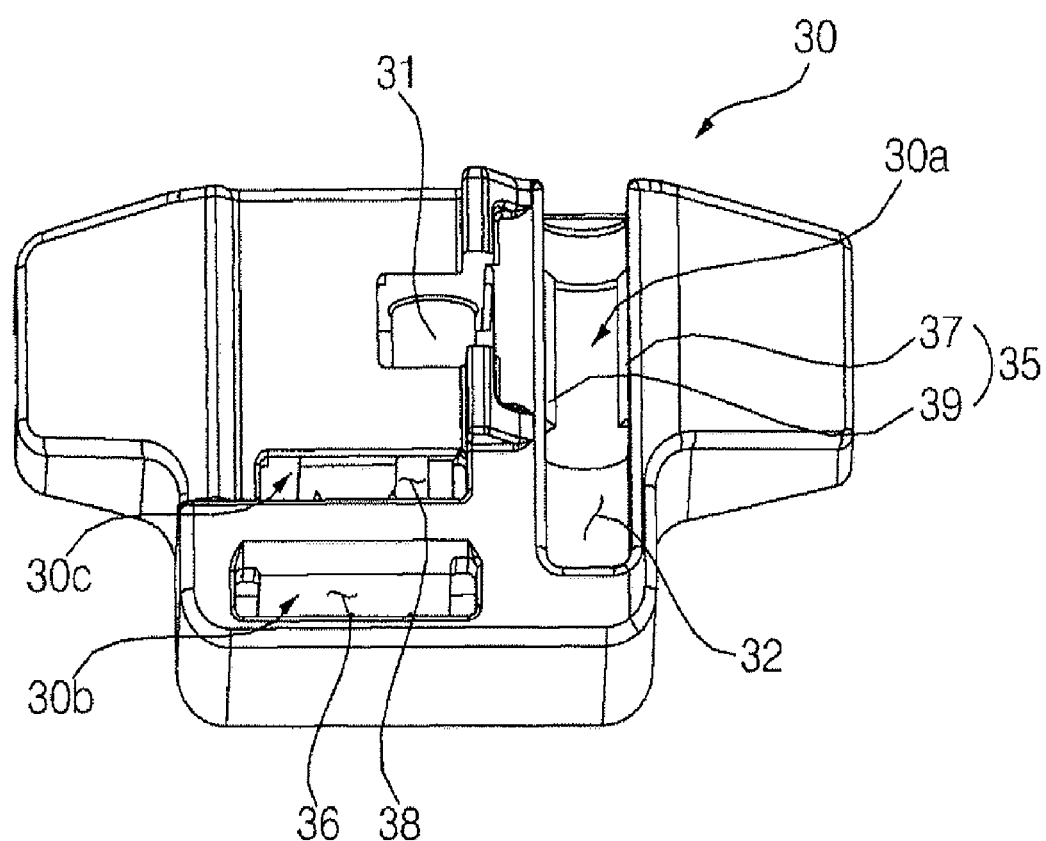

[Fig. 6b]
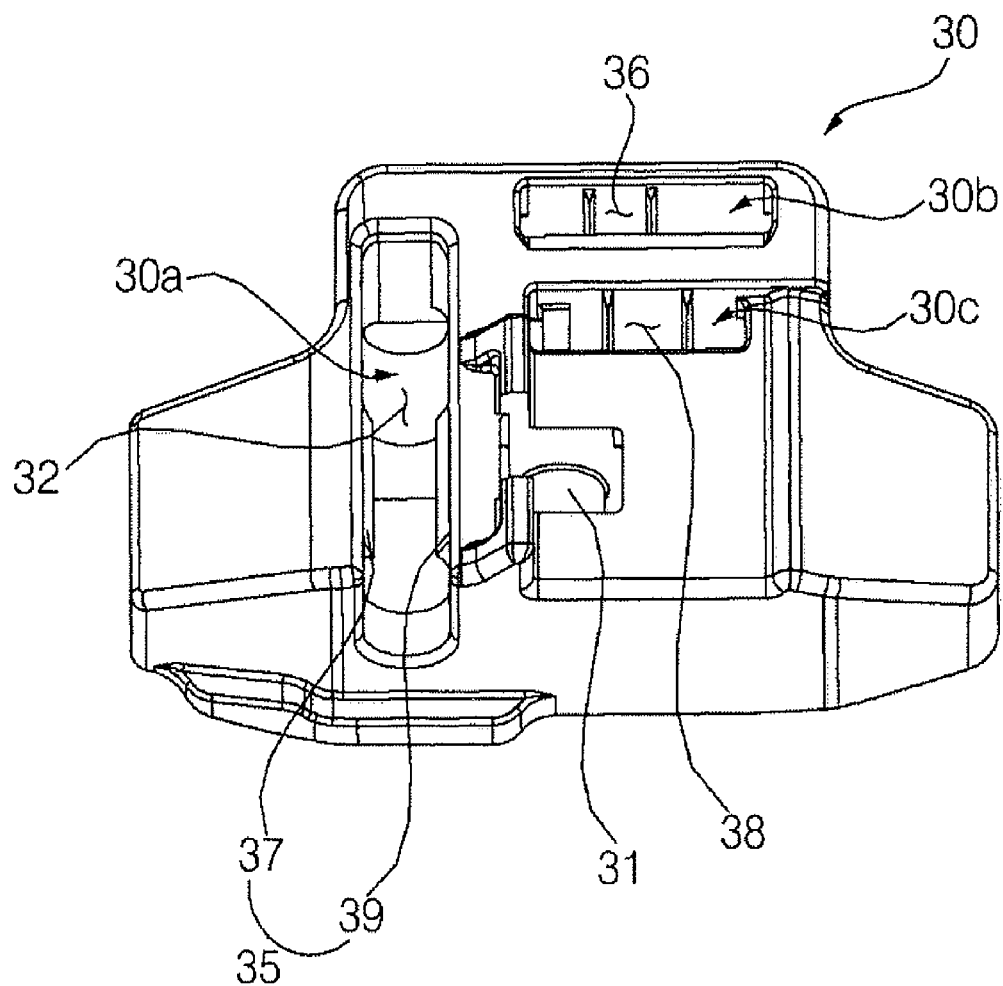

[Fig. 6c]
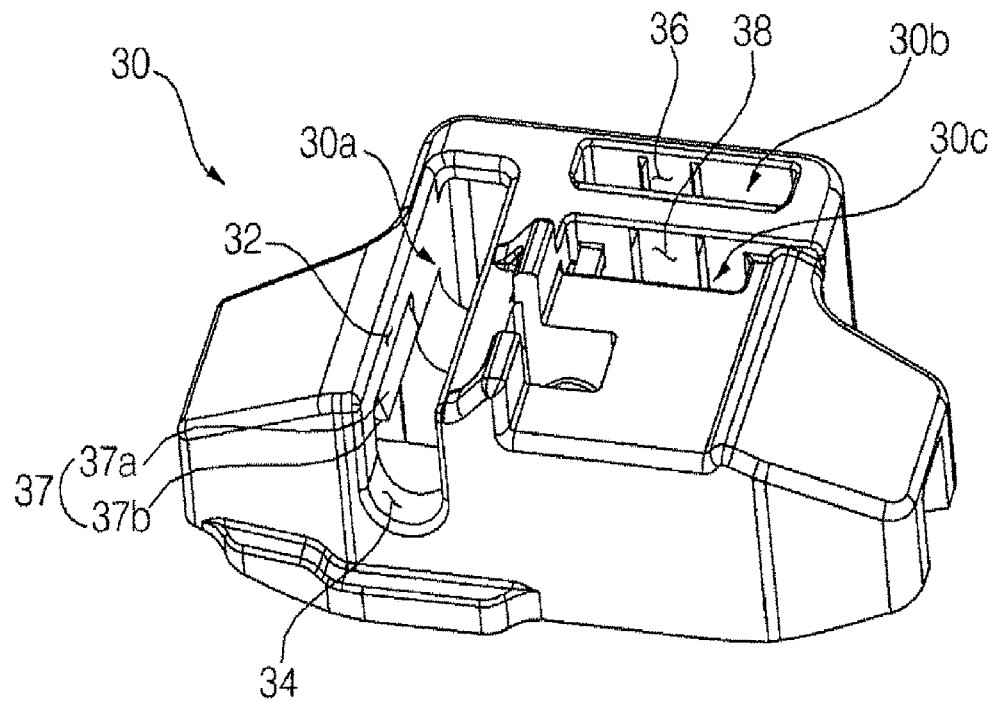
[Fig. 6d]
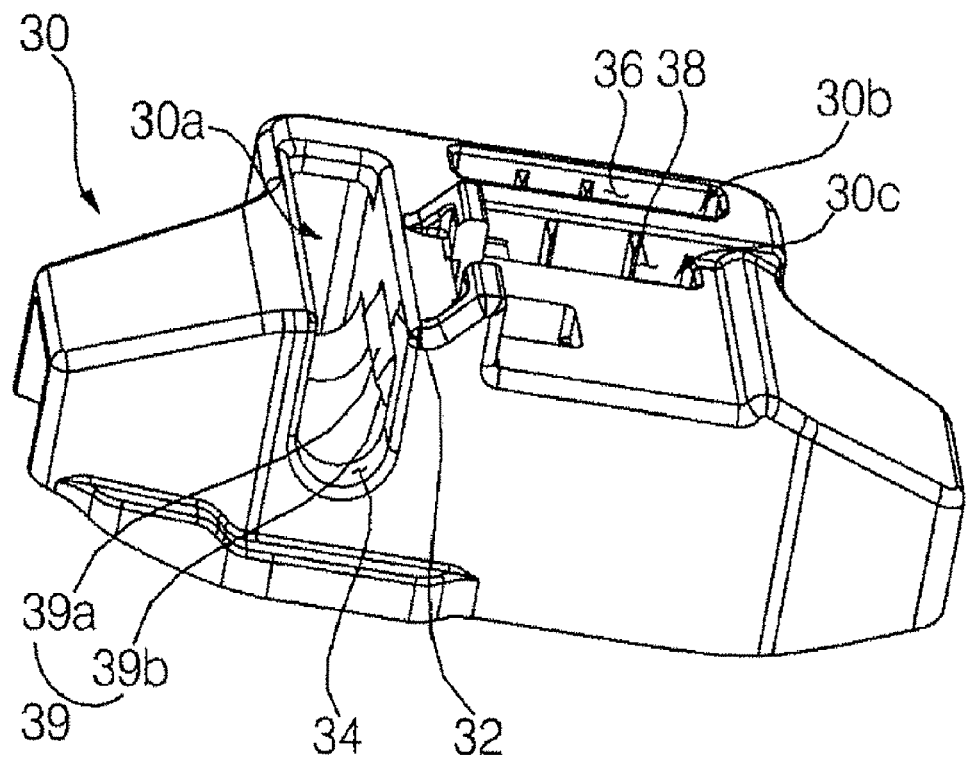

[Fig. 7a]
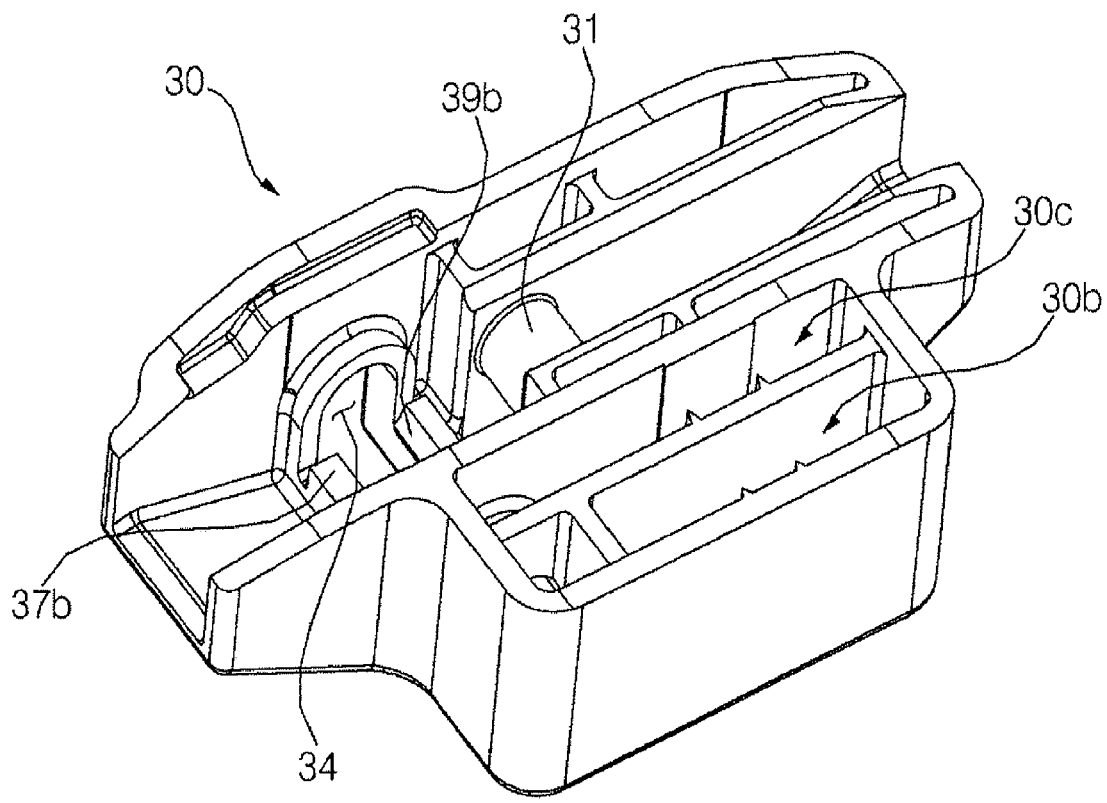
[Fig. 7b]
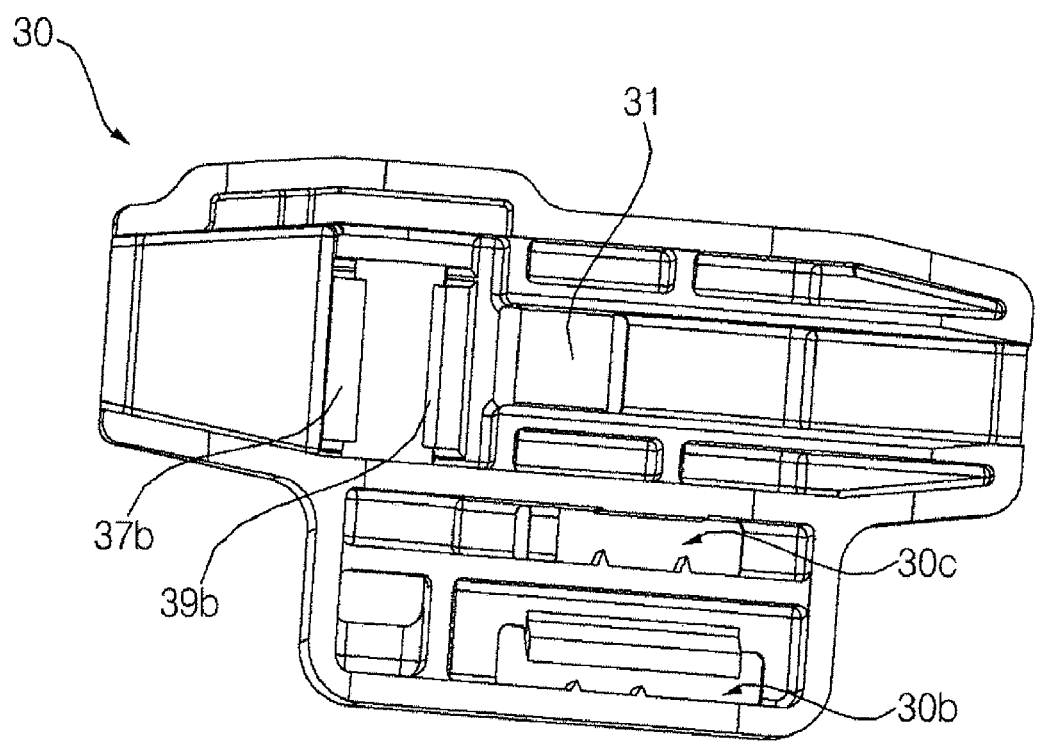

[Fig. 8a]
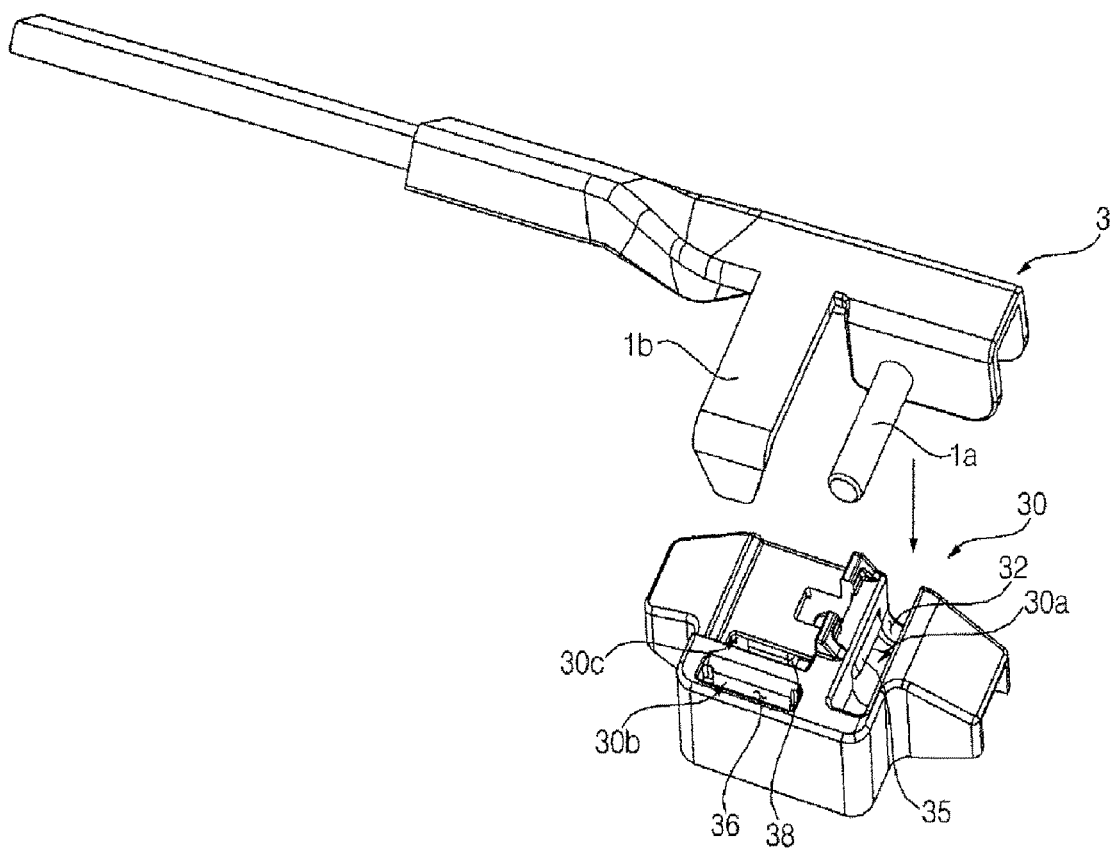

[Fig. 8b]
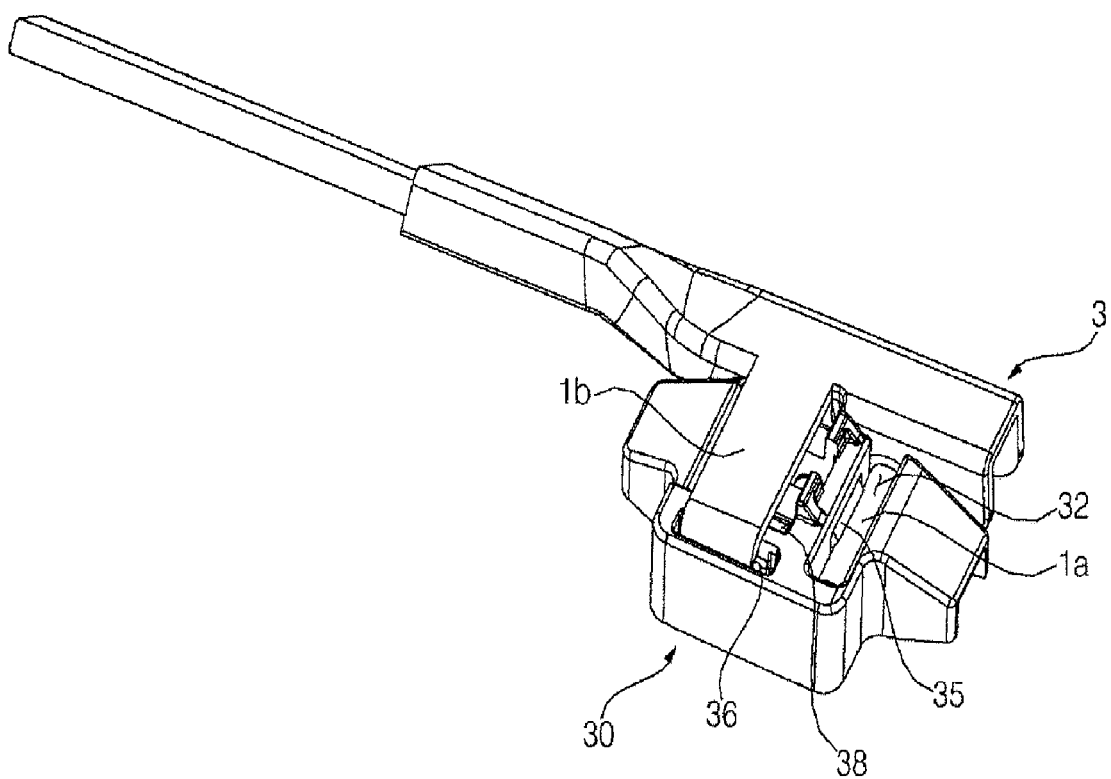

[Fig. 8c]
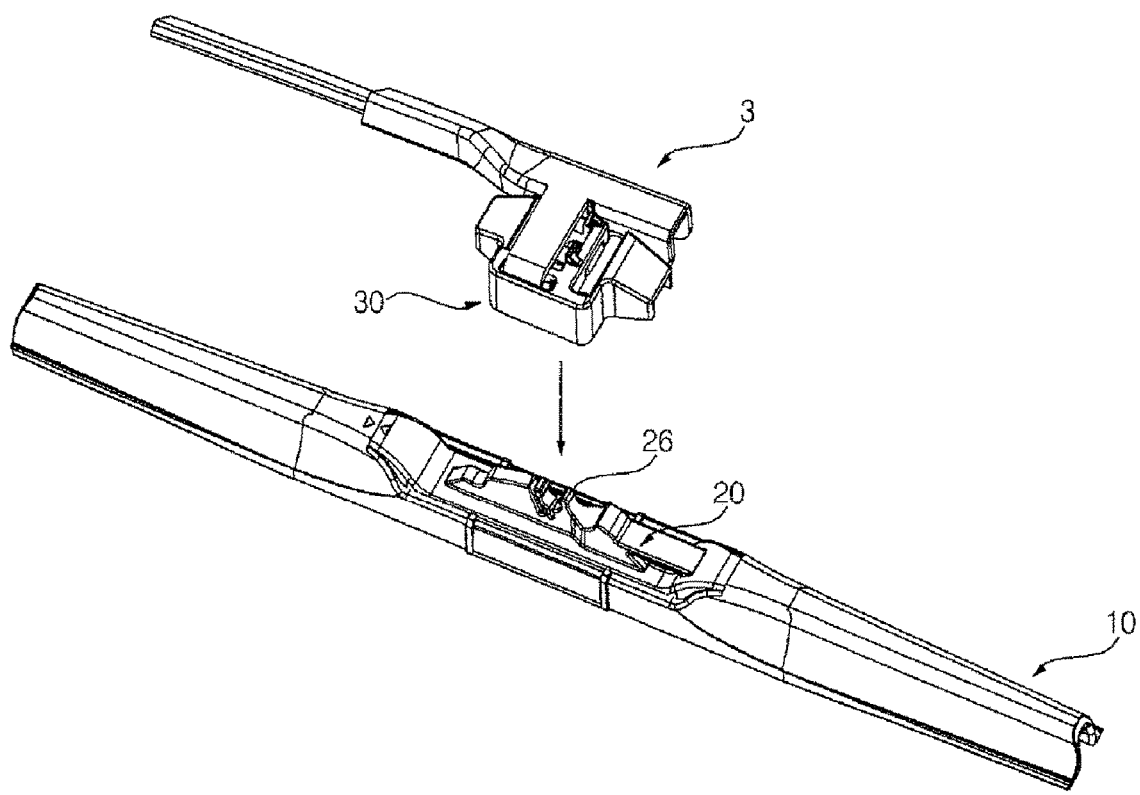

[Fig. 9a]
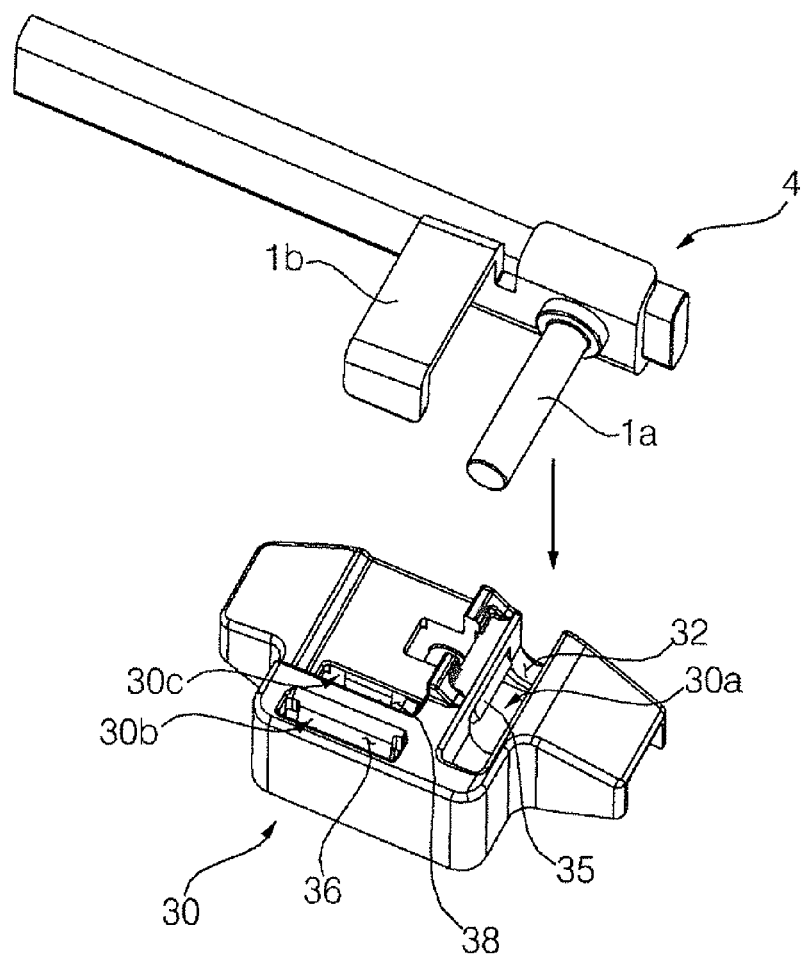

[Fig. 9b]
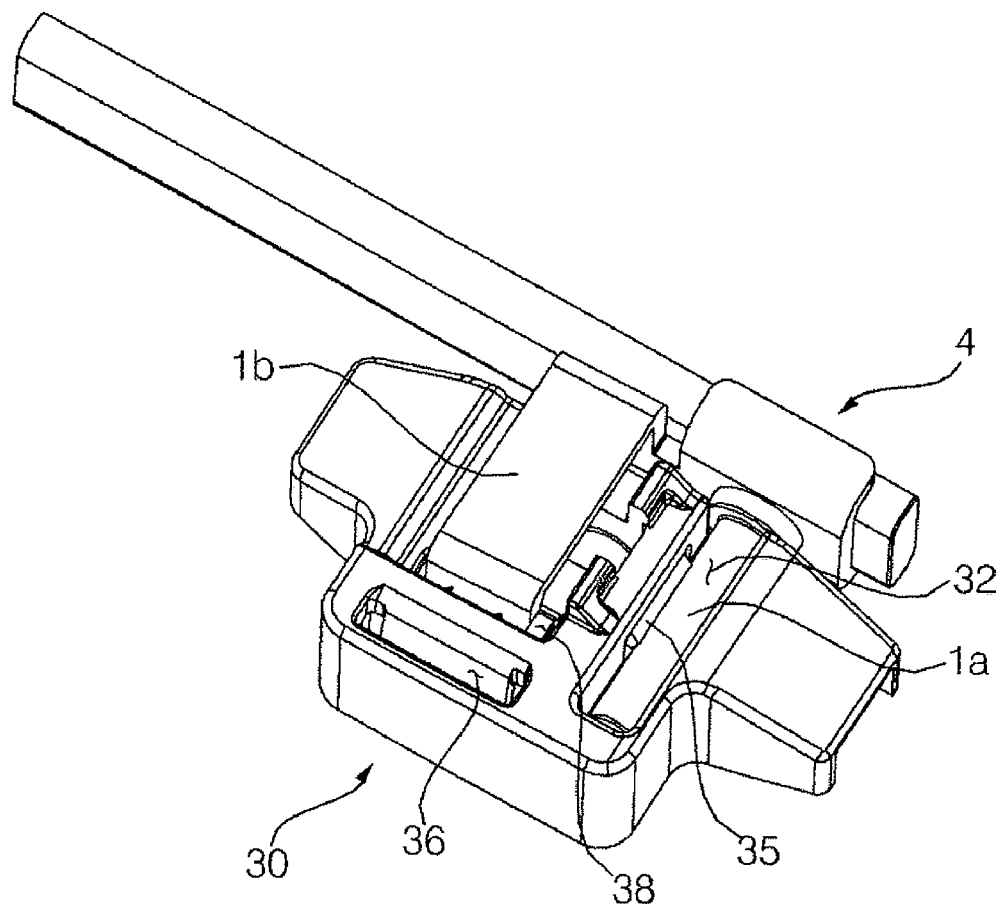

[Fig. 9c]
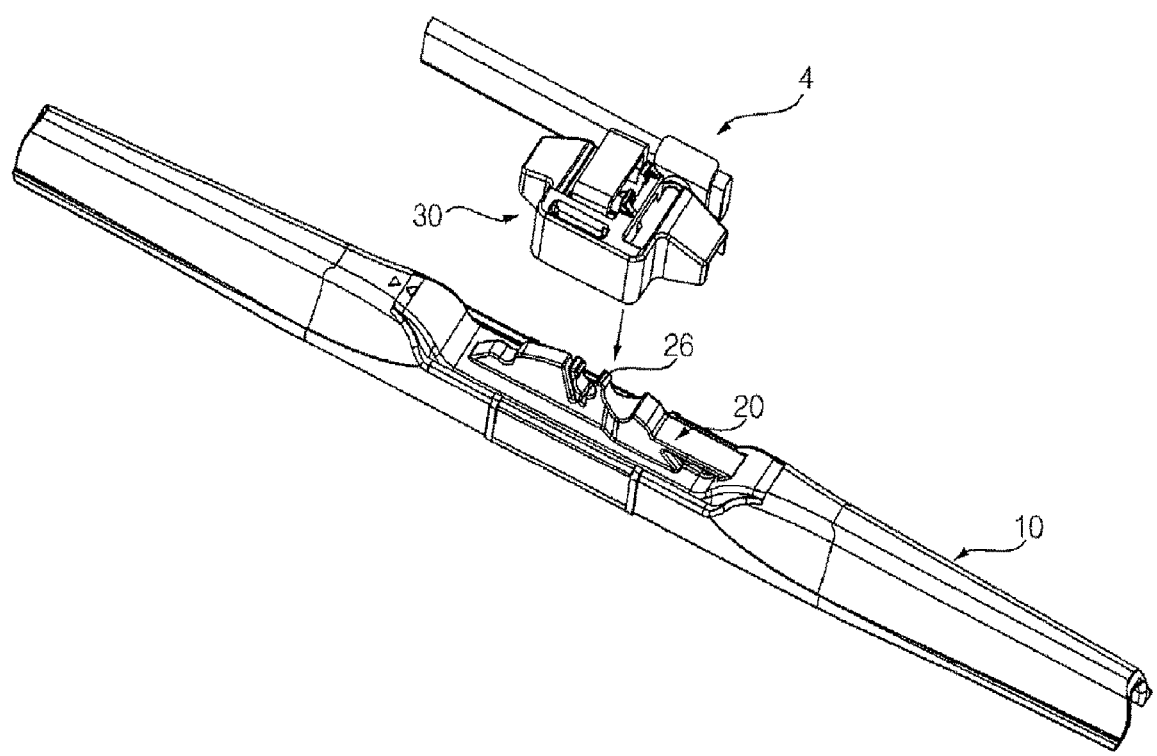

WINDSHIELD WIPER ASSEMBLY

TECHNICAL FIELD

The present invention relates to a windshield wiper assembly, and more particularly to a windshield wiper assembly that is capable of wiping foreign matter from a vehicle.

BACKGROUND ART

In general, a vehicle is equipped with a windshield, which is made of glass, for preventing foreign matter, such as wind, rain, snow, or dust, from being introduced into the vehicle while securing a visual field.

The windshield is provided at the front of the vehicle, and a windshield wiper assembly, which is configured to wipe foreign matter, such as rain, snow, or dust, from the windshield, is mounted to the windshield.

The windshield wiper assembly includes a driving arm rotatably installed in the vehicle and a wiper configured to turn along the surface of the windshield in response to the operation of the driving arm. During turning of the wiper, a blade or a squeegee provided at the wiper wipes moisture or foreign matter from the surface of the windshield.

DISCLOSURE OF INVENTION

Technical Problem

Therefore, the present invention has been made in view of the above problems, and it is an object of the present invention to provide a windshield wiper assembly configured to be easily assembled to a driving arm equipped in a vehicle.

Technical problems to be solved by the present invention are not limited to the afore-mentioned technical problem, and other technical problems will be clearly understood by those skilled in the art to which the present invention pertains in view of the following description.

Solution to Problem

In accordance with an aspect of the present invention, the above and other objects can be accomplished by the provision of a windshield wiper assembly including a wiping rubber member configured to be brought into contact with a windshield of a vehicle, a spoiler for supporting the wiping rubber member and enabling the wiping rubber member to be brought into tight contact with the windshield by the pressure of wind applied while the vehicle is being driven, an adaptor holder coupled to a middle portion of the spoiler in the longitudinal direction for supporting the spoiler, and an adaptor rotatably coupled to the adaptor holder, the adaptor being connected to a driving arm equipped in the vehicle, wherein the adaptor is provided with a first coupling part, into which a side pin protruding from the side surface of the driving arm is inserted, and a first entrance of the first coupling part, into which the side pin is inserted, is open upward.

Details of other embodiments are included in the detailed description of the preferred embodiment and the accompanying drawings.

Advantageous Effects of Invention

In a windshield wiper assembly according to the present invention, an adaptor is provided with a first coupling part, into which a side pin protruding from the side surface of a driving arm is inserted, and a first entrance of the first coupling part, into which the side pin is inserted, is open upward. Consequently, the side pin is coupled into the first coupling part from above the adaptor, whereby the adaptor is easily coupled to the driving arm.

The effects of the present invention are not limited to the above-described effects. It is obvious to those skilled in the art that other different effects may be clearly understood from the accompanying claims.

BRIEF DESCRIPTION OF DRAWINGS

The above and other objects, features and other advantages of the present invention will be more clearly understood from the following detailed description taken in conjunction with the accompanying drawings, in which:

FIG. 1 is a view showing a windshield wiper assembly according to an embodiment of the present invention and driving arms that may be equipped in a vehicle;

FIGS. 2A and 2B are exploded perspective views showing the windshield wiper assembly according to the embodiment of the present invention;

FIG. 3 is a view showing a state in which an adaptor holder is coupled to a spoiler of the windshield wiper assembly according to the embodiment of the present invention;

FIG. 4A is a view showing the spoiler and a wiping rubber member of the windshield wiper assembly according to the embodiment of the present invention;

FIG. 4B is a bottom view showing the spoiler of the windshield wiper assembly according to the embodiment of the present invention;

FIG. 4C is a sectional view taken along line I-I of FIG. 3A;

FIG. 5A is a front perspective view showing the adaptor holder of the windshield wiper assembly according to the embodiment of the present invention;

FIG. 5B is a rear perspective view showing the adaptor holder of the windshield wiper assembly according to the embodiment of the present invention;

FIGS. 6A to 6D are front perspective views showing an adaptor of the windshield wiper assembly according to the embodiment of the present invention;

FIGS. 7A and 7B are rear perspective views showing the adaptor of the windshield wiper assembly according to the embodiment of the present invention;

FIGS. 8A to 8C are views showing a sequence in which a first type driving arm equipped in a vehicle, the adaptor, and the adaptor holder are coupled to one another; and FIGS. 9A to 9C are views showing a sequence in which a second type driving arm equipped in a vehicle, the adaptor, and the adaptor holder are coupled to one another.

BEST MODE FOR CARRYING OUT THE INVENTION

Reference will now be made in detail to embodiments, examples of which are illustrated in the accompanying drawings. However, the present invention may be embodied in many different forms and should not be construed as limited to the embodiments set forth herein. Rather, these embodiments are provided so that the present invention will be thorough and complete, and will fully convey the scope of the present invention to those skilled in the art. The present invention is defined only by the categories of the claims. Wherever possible, the same reference numbers will be used throughout the drawings to refer to the same or like parts.

Hereinafter, a windshield wiper assembly according to an embodiment of the present invention will be described in detail with reference to the accompanying drawings.

FIG. 1 is a view showing a windshield wiper assembly according to an embodiment of the present invention and driving arms that may be equipped in a vehicle, FIGS. 2A and 2B are exploded perspective views showing the windshield wiper assembly according to the embodiment of the present invention, and FIG. 3 is a view showing a state in which an adaptor holder is coupled to a spoiler of the windshield wiper assembly according to the embodiment of the present invention.

Referring to FIGS. 1 to 3, a windshield wiper assembly 100 according to an embodiment of the present invention includes a spoiler 10, an adaptor holder 20, and an adaptor 30.

The spoiler 10, to which the pressure of wind is applied while the vehicle is being driven, is configured to support a wiping rubber member 40 (see FIG. 4A). The spoiler 10 enables the wiping rubber member 40 to be brought into tight contact with a windshield of the vehicle by the pressure of wind applied while the vehicle is being driven. Specifically, an elastic member (not shown) disposed in the spoiler 10 may be bent by the pressure of wind, with the result that the elastic member generates elastic force. The wiping rubber member 40 may be brought into tight contact with the windshield of the vehicle by the elastic force generated by the elastic member. The elastic member is a plate spring, which is inserted into the spoiler 10 in the longitudinal direction. The elastic member is coupled to the wiping rubber member 40. Specifically, a pair of elastic members, which are spaced apart from each other in the lateral direction, are provided such that the upper end of the wiping rubber member 40 is inserted into the space defined between the elastic members. During turning of the windshield wiper assembly 100 according to the embodiment of the present invention, which is coupled to one of the driving arms 1, 2, 3, 4, and 5 equipped in the vehicle, the wiping rubber member 40 wipes foreign matter, such as rainwater, from the surface of the windshield. The wiping rubber member 40 may be made of a flexible material, such as rubber or synthetic resin, which can be deformed by external force.

The adaptor holder 20 is coupled to a middle portion of the spoiler 10 in the longitudinal direction to support the spoiler 10. The adaptor 30 is rotatably coupled to the adaptor holder 20. In addition, the adaptor 30 is connected to one of the driving arms 1, 2, 3, 4, and 5 equipped in the vehicle. When the windshield wiper assembly 100 according to the embodiment of the present invention is turned along the surface of the windshield by the driving force of one of the driving arms 1, 2, 3, 4, and 5, the adaptor 30 enables the wiping rubber member 40 to be brought into tight contact with the curved surface of the windshield while rotating relative to the adaptor holder 10.

Meanwhile, the driving arms 1, 2, 3, 4, and 5 are connected to the adaptor 30 in order to turn the windshield wiper assembly 100 according to the embodiment of the present invention along the surface of the windshield. Various types of driving arms are provided based on the specification of the vehicle. FIG. 1 illustrates five types of driving arms 1, 2, 3, 4, and 5. The driving arms 1, 2, 3, 4, and 5 may be generally classified into two types based on the length by which a side piece 1b protrudes. That is, the driving arms 1, 2, 3, 4, and 5 may be classified into first types of driving arms 1, 2, and 3, the side piece 1b of which is relatively long, and second types of driving arms 4 and 5, the side piece 1b of which is relatively short.

A side pin 1a, which is coupled to the adaptor 30, and a side piece 1b protrude from the side surface of each of the driving arms 1, 2, 3, 4, and 5. The side pin 1a is formed in a cylindrical shape having a circular section. The side piece 1b is formed in a plate shape. The side piece 1b protrudes in the same direction as the direction in which the side pin 1a protrudes, and the tip of the side piece 1b is bent so as to be perpendicular to the direction in which the side pin 1a protrudes.

Hereinafter, the spoiler 10 will be described in detail.

FIG. 4A is a view showing the spoiler and the wiping rubber member of the windshield wiper assembly according to the embodiment of the present invention, FIG. 4B is a bottom view showing the spoiler of the windshield wiper assembly according to the embodiment of the present invention, and FIG. 4C is a sectional view taken along line I-I of FIG. 3A.

Referring to FIGS. 4A and 4B together with FIGS. 1 to 3, the upper side of a middle portion of the spoiler 10 in the longitudinal direction is cut to form a recess 10a in the spoiler 10. A partition wall 12 is formed at the lower side of the recess 10a. The partition wall 12 partitions the recess 10a, i.e. the space formed by cutting a portion of the upper side of the spoiler 10, from the inner space of the spoiler 10.

The partition wall 12 is provided at one end thereof with a first opening hole 13, into which the adaptor holder 20 is coupled. In addition, the partition wall 12 is provided at the other end thereof with a second opening hole 14, into which the adaptor holder 20 is coupled.

The partition wall 12 includes a straight part 12a disposed at the middle portion thereof, a first curved part 12b extending from one end of the straight part 12a in the longitudinal direction, and a second curved part 12c extending from the other end of the straight part 12a in the longitudinal direction. The straight part 12a extends straight in the longitudinal direction. The first curved part 12b and the second curved part 12c are curved at a predetermined curvature in the longitudinal direction such that the first curved part 12b and the second curved part 12c protrude upward. The first opening hole 13 is formed in the first curved part 12b, and the second opening hole 14 is formed in the second curved part 12c. The first opening hole 13 and the second opening hole 14 communicate with the recess 10a and the inner space of the spoiler 10. The portion of the partition wall 12 other than the first opening hole 13 and the second opening hole 14 partitions the recess 10a and the inner space of the spoiler 10 from each other.

A first boss 11 is formed at the lower side of the second opening hole 14 such that the first boss 11 extends in the lateral direction. That is, the first boss 11 is disposed in the spoiler 10 under the second opening hole 14. One end of the first boss 11 is integrally formed at one side of the spoiler 10, and the other end of the first boss 11 is integrally formed at the other side of the spoiler 10.

Referring to FIG. 4C, on the cross section across the longitudinal direction, the spoiler 10 includes a first side surface 15, on which a first wind pressure application surface 15a is formed, a second side surface 16, on which a second wind pressure application surface 16a is formed, an upper surface 17, a first connection surface 18, and a second connection surface 19.

The first side surface 15 defines one side surface of the spoiler 10, and the second side surface 16, which is spaced apart from the first side surface 15 in the lateral direction, defines the other side surface of the spoiler 10.

The first wind pressure application surface 15a and the second wind pressure application surface 16a are surfaces to which the pressure of wind is applied while the vehicle is being driven. The first wind pressure application surface 15a is formed on the upper part of the first side surface 15, and the second wind pressure application surface 16a is formed on the upper part of the second side surface 16. The first wind pressure application surface 15a and the second wind pressure application surface 16a are depressed inwardly of the spoiler 10 such that the first wind pressure application surface 15a and the second wind pressure application surface 16a are concave. The first wind pressure application surface 15a and the second wind pressure application surface 16a have corresponding shapes, and are spaced apart from each other. Specifically, the distance between the first wind pressure application surface 15a and the second wind pressure application surface 16a is gradually increased toward the upper side of the spoiler 10. In other words, the distance between the first wind pressure application surface 15a and the second wind pressure application surface 16a is gradually decreased toward the lower side of the spoiler 10.

The upper surface 17 is flat. The width and the height of the upper surface 17 are gradually decreased toward the lower side of the spoiler 10. The first connection surface 18 is convex. The first connection surface 18 connects one side of the upper surface 17 with the upper side of the first wind pressure application surface 15a. The second connection surface 19 is convex such that the second connection surface 19 corresponds to the first connection surface 18. The second connection surface 19 connects the other side of the upper surface 17 with the upper side of the second wind pressure application surface 16a.

Since the recess 10a is formed by cutting the upper side of the middle portion of the spoiler 10 in the longitudinal direction, the first wind pressure application surface 15a, the second wind pressure application surface 16a, the upper surface 17, the first connection surface 18, and the second connection surface 19 are not formed at the middle portion of the spoiler 10 in the longitudinal direction due to the recess 10a. That is, the first wind pressure application surface 15a, the second wind pressure application surface 16a, the upper surface 17, the first connection surface 18, and the second connection surface 19 extend from one end of the recess 10a to one end of the spoiler 10 in the longitudinal direction of the spoiler 10. In addition, the first wind pressure application surface 15a, the second wind pressure application surface 16a, the upper surface 17, the first connection surface 18, and the second connection surface 19 extend from the other end of the recess 10a to the other end of the spoiler 10 in the longitudinal direction of the spoiler 10.

Hereinafter, the adaptor holder 20 will be described in detail.

FIG. 5A is a front perspective view showing the adaptor holder of the windshield wiper assembly according to the embodiment of the present invention, and FIG. 5B is a rear perspective view showing the adaptor holder of the windshield wiper assembly according to the embodiment of the present invention.

Referring to FIGS. 5A and 5B together with FIGS. 1 to 3, the adaptor holder 20 is provided at one end thereof with a catching protrusion 23, which protrudes in the longitudinal direction. In addition, the adaptor holder 20 is provided at the other end thereof with a first elastic catching part 24, which protrudes downward. The catching protrusion 23 is inserted through the first opening hole 13, formed in the partition wall 12 of the spoiler 10, and is then caught by the upper surface of the spoiler 10 in the spoiler 10. The first elastic catching part 24 is inserted through the second opening hole 14, formed in the partition wall 12 of the spoiler 10, and is then elastically caught by the first boss 11.

When the catching protrusion 23 is inserted into the first opening hole 13, the first elastic catching part 24 is inserted into the second opening hole 14 while the adaptor holder 20 is located on the partition wall 12, and the other end of the adaptor holder 20, on which the first elastic catching part 24 is formed, is pushed, the first elastic catching part 24 is elastically caught by the first boss 11. As a result, the adaptor holder 20 is coupled to the spoiler 10. The lower side of the first elastic catching part 24 may be open such that the first boss 11 is inserted into the first elastic catching part 24 when the other end of the adaptor holder 20 is pushed.

The adaptor holder 20 includes a base part 20a extending straight in the longitudinal direction so as to correspond to the straight part 12a of the partition wall 12 such that the base part 20 is located on the straight part 12a, a third curved part 20b extending from one end of the base part 20 in the longitudinal direction while being curved at a curvature corresponding to the first curved part 12b of the partition wall 12 such that the third curved part 20b protrudes upward, and a fourth curved part 20c extending from the other end of the base part 20 in the longitudinal direction while being curved at a curvature corresponding to the second curved part 12c of the partition wall 12 such that the fourth curved part 20c protrudes upward. The catching protrusion 23 is formed on the third curved part 20b, and the first elastic catching part 24 is formed on the fourth curved part 20c.

The portions of the upper surface 17 of the spoiler 10 located at the opposite ends of the recess 10a have widths corresponding to the widths of the third curved part 20b and the fourth curved part 20c. In a state in which the adaptor holder 20 is coupled to the spoiler 10, no step is formed between the third curved part 20b and the upper surface 17 of the spoiler 10, and no step is formed between the fourth curved part 20c and the upper surface 17 of the spoiler 10.

The adaptor holder 20 is further provided at the upper side of the middle portion thereof in the longitudinal direction with a second elastic catching part 26, which is coupled to the adaptor 30. A second boss 31 formed in the adaptor 30, which will be described hereinafter, is inserted into the second elastic catching part 26 such that the second boss 31 is caught by the second elastic catching part 26. As a result, the adaptor 30 is rotatably coupled to the adaptor holder 20. The upper side of the second elastic catching part 26 may be open such that the adaptor 30 moves downward from above the adaptor holder 20 so as to be coupled to the adaptor holder 20.

Hereinafter, the adaptor 30 will be described in detail.

FIGS. 6A to 6D are front perspective views showing the adaptor of the windshield wiper assembly according to the embodiment of the present invention, and FIGS. 7A and 7B are rear perspective views showing the adaptor of the windshield wiper assembly according to the embodiment of the present invention.

Referring to 6A to 7B together with FIGS. 1 to 2B, the adaptor 30 is provided with a first coupling part 30a, into which the side pin 1a, formed on one of the driving arms 1, 2, 3, 4, and 5, is inserted, and second coupling parts 30b and 30c, into which the side piece 1b, formed on one of the driving arms 1, 2, 3, 4, and 5, is inserted.

The second coupling parts 30b and 30c are spaced apart from each other in the lateral direction of the adaptor 30. The side piece 1*b* of one of the first type driving arms 1, 2, and 3 is inserted into one of the second coupling parts 30*b* and 30*c*, i.e. the second coupling part 30*b*, and the side piece 1*b* of one of the second type driving arms 4 and 5 is inserted into the other of the second coupling parts 30*b* and 30*c*, i.e. the second coupling part 30*c*.

The first coupling part 30*a* is configured as a groove that is depressed downward when viewed from the upper surface of the adaptor 30. In addition, the first coupling part 30*a* is configured as a groove that is depressed laterally when viewed from the side surface of the adaptor 30. The second coupling parts 30*b* and 30*c* are configured as holes extending from the upper side to the lower side of the adaptor 30.

The side pin 1*a*, which is inserted into the first coupling part 30*a*, protrudes straight from the side surface of one of the driving arms 1, 2, 3, 4, and 5, whereas the side piece 1*b* protrudes straight from the side surface of one of the driving arms 1, 2, 3, 4, and 5, and the tip of the side piece 1*b*, which is inserted into one of the second coupling parts 30*b* and 30*c*, is bent downward so as to perpendicular to the direction in which the side pin 1*a* protrudes.

In order to couple the adaptor 30 to one of the driving arms 1, 2, 3, 4, and 5, the side pin 1*a* is inserted into the first coupling part 30*a* from above the adaptor 30, and the side piece 1*b* is inserted into one of the second coupling parts 30*b* and 30*c* from above the adaptor 30. A first entrance 32 of the first coupling part 30*a*, into which the side pin 1*a* is inserted, is open upward. Second entrances 36 and 38 of the second coupling parts 30*b* and 30*c*, into one of which the side piece 1*b* is inserted, are open in the same direction as the direction in which the first entrance 32 is open, i.e. upward. When the side pin 1*a* is inserted into the first coupling part 30*a* from above the adaptor 30 and the side piece 1*b* is inserted into one of the second coupling parts 30*b* and 30*c*, therefore, the adaptor 30 is easily coupled to one of the driving arms 1, 2, 3, 4, and 5.

The first coupling part 30*a* includes a coupling recess 34 extending downward from the first entrance 32 such that the side pin 1*a* is located on a coupling position and an elastic catching end 35 for partitioning the first entrance 32 and the coupling recess 34 from each other. The elastic catching end 35 guides the side pin 1*a*, inserted into the first entrance 32, to the coupling recess 34 while elastically supporting the side pin 1*a*.

The elastic catching end 35 includes a first catching end 37 protruding from one side between the first entrance 32 and the coupling recess 34 and a second catching end 39 protruding from the other side between the first entrance 32 and the coupling recess 34.

The upper surface of the first catching end 37, which is brought into contact with the side pin 1*a* inserted into the first entrance 32, is formed as a first inclined surface 37*a* that is inclined with respect to the direction in which the side pin 1*a* is inserted. In addition, the upper surface of the second catching end 39, which is brought into contact with the side pin 1*a* inserted into the first entrance 32, is formed as a second inclined surface 39*a* that is inclined with respect to the direction in which the side pin 1*a* is inserted. Consequently, the side pin 1*a*, inserted into the first entrance 32, is elastically supported by the first inclined surface 37*a* and the second inclined surface 39*a*. When a user applies force, the side pin 1*a* easily moves along the first inclined surface 37*a* and the second inclined surface 39*a*, with the result that the side pin 1*a* is inserted into the coupling recess 34, which is the coupling position.

In addition, the lower surface of the first catching end 37, which is brought into contact with the side pin 1*a* inserted into the coupling recess 34, is formed as a horizontal surface 37*b* that is perpendicular to the direction in which the side pin 1*a* is inserted. On the other hand, the lower surface of the second catching end 39, which is brought into contact with the side pin 1*a* inserted into the coupling recess 34, is formed as a curved surface 39*b* corresponding to the outer surface of the side pin 1*a*. While the windshield wiper assembly 100 according to the embodiment of the present invention turns along the windshield, therefore, the curved surface 39*b* of the adaptor 30 is brought into contact with the outer surface of the side pin 1*a*, with the result that the adaptor 30 can be easily rotated. In addition, the side pin 1*a* is prevented from being separated from the adaptor 30 owing to the horizontal surface 37*b*.

The windshield wiper assembly 100 with the above-stated construction according to the embodiment of the present invention is assembled as follows.

FIGS. 8A to 8C are views showing a sequence in which the first type driving arm equipped in the vehicle, the adaptor, and the adaptor holder are coupled to one another. Hereinafter, one of the first type driving arms 1, 2, and 3, i.e. the first type driving arm 3, shown in FIG. 1, will be described by way of example.

Referring to FIGS. 8A to 8C, the adaptor 30 is placed under the first type driving arm 3, the side pin 1*a* is inserted into the first entrance 32 from above the first coupling part 30*a*, and the tip of the side piece 1*b* is inserted through the second entrance 36 from above the second coupling part 30*b*. As a result, the side pin 1*a* is disposed in the first entrance 32 while being elastically supported by the elastic catching end 35, and the tip of the side piece 1*b* inserted into the second entrance 36 is partially inserted into the second coupling part 30*b*.

Subsequently, when the portion of the first type driving arm 3 at which the side pin 1*a* is formed is pushed or the portion of the adaptor 30 at which the first coupling part 30*a* is formed is pulled upward, the side pin 1*a* inserted into the first entrance 32 moves downward along the first inclined surface 37*a* and the second inclined surface 39*a* of the elastic catching end 35, and is then inserted into the coupling recess 34, which is the coupling position. In addition, the tip of the side piece 1*b*, which is in a state of being partially inserted into the second coupling part 30*b*, is completely inserted into the second coupling part 30*b*. As a result, the coupling between the adaptor 30 and the first type driving arm 3 is completed.

In a state in which the adaptor 30 is coupled to the first type driving arm 3, as described above, the spoiler 10, to which the adaptor holder 20 is coupled, is placed under the adaptor 30, and the second boss 31, formed on the adaptor 30, is inserted into the second elastic catching part 26, which is formed in the adaptor holder 20, as shown in FIG. 8C. As a result, the assembly process of the windshield wiper assembly 100 according to the embodiment of the present invention is completed.

FIGS. 9A to 9C are views showing a sequence in which the second type driving arm equipped in the vehicle, the adaptor, and the adaptor holder are coupled to one another. Hereinafter, one of the second type driving arms 4 and 5, i.e. the second type driving arm 4, shown in FIG. 1, will be described by way of example.

The second type driving arm 4 is different from each of the first type driving arms 1, 2, and 3 in that the protruding length of the side piece 1*b* of the second type driving arm 4 is shorter than the protruding length of the side piece 1*b* of each of the first type driving arms 1, 2, and 3.

The assembly process of the windshield wiper assembly in FIGS. 9A to 9C is identical to the assembly process of the windshield wiper assembly in FIGS. 8A to 8C, except that the side piece 1b of the first type driving arm 3 is coupled to one of the second coupling parts 30b and 30c, i.e. the second coupling part 30b, of the adaptor 30, as shown in FIGS. 8A to 8C, whereas the side piece 1b of the second type driving arm 4 is coupled to the other of the second coupling parts 30b and 30c, i.e. the second coupling part 30c, of the adaptor 30, as shown in FIGS. 9A to 9C. Consequently, a detailed description of the process of assembling the windshield wiper assembly in FIGS. 9A to 9C will be omitted.

As described above, in the windshield wiper assembly 100 according to the embodiment of the present invention, the first coupling part 30a and the second coupling parts 30b and 30c are formed at the adaptor 30, which is connected to one of the driving arms 1, 2, 3, 4, and 5 equipped in the vehicle, wherein the first entrance 32 of the first coupling part 30a, into which the side pin 1a of one of the driving arms 1, 2, 3, 4, and 5 is inserted, and the second entrances 36 and 38 of the second coupling parts 30b and 30c, into one of which the side piece 1b of one of the driving arms 1, 2, 3, 4, and 5 is inserted, are open in the same direction. Consequently, the side pin 1a and the side piece 1b are inserted into the first entrance 32 and one of the second coupling parts 30b and 30c in the same direction, whereby the adaptor 30 is easily coupled to one of the driving arms 1, 2, 3, 4, and 5.

MODE FOR THE INVENTION

Various embodiments have been described in the best mode for carrying out the invention.

INDUSTRIAL APPLICABILITY

The present invention is applied to fields related to a windshield wiper assembly.

Those skilled in the art to which the present invention pertains will appreciate that the present invention may be carried out in other specific ways than those set forth herein without departing from the technical ideas and essential characteristics of the present invention. The above embodiments are therefore to be construed in all aspects as illustrative and not restrictive. The scope of the invention should be determined by the appended claims, not by the above description, and all changes and modifications derived from the meaning and scope of the appended claims and their equivalents are intended to be embraced therein.

The invention claimed is:

1. A windshield wiper assembly comprising:
a wiping rubber member configured to be brought into contact with a windshield of a vehicle;
a spoiler for supporting the wiping rubber member and enabling the wiping rubber member to be brought into tight contact with the windshield by pressure of wind applied while the vehicle is being driven;
an adaptor holder coupled to a middle portion of the spoiler in a longitudinal direction for supporting the spoiler; and
an adaptor rotatably coupled to the adaptor holder, the adaptor being connected to a driving arm equipped in the vehicle, wherein the adaptor is provided with a first coupling part, into which a side pin protruding from a side surface of the driving arm is inserted, and a first entrance of the first coupling part, into which the side pin is inserted, is open upward,
wherein the first coupling part comprises:
a coupling recess extending from the first entrance such that the side pin is located on a coupling position; and
an elastic catching end for partitioning the first entrance and the coupling recess from each other and guiding the side pin, inserted into the first entrance, to the coupling recess while elastically supporting the side pin.

2. The windshield wiper assembly according to claim 1, wherein the adaptor is further provided with a second coupling part, into which a side piece protruding from the side surface of the driving arm is inserted, a tip of the side piece being bent so as to be perpendicular to a direction in which the side pin protrudes, and the second entrance of the second coupling part, into which the side piece is inserted, is open in the same direction as a direction in which the first entrance of the first coupling part is open.

3. The windshield wiper assembly according to claim 2, wherein the second coupling part comprises a plurality of second coupling parts spaced apart from each other in a lateral direction of the adaptor.

4. The windshield wiper assembly according to claim 1, wherein the elastic catching end comprises:
a first catching end protruding from one side between the first entrance and the coupling recess; and
a second catching end protruding from the other side between the first entrance and the coupling recess.

5. The windshield wiper assembly according to claim 4, wherein a surface of the first catching end which is brought into contact with the side pin inserted into the first entrance is formed as a first inclined surface that is inclined with respect to a direction in which the side pin is inserted, and a surface of the second catching end which is brought into contact with the side pin inserted into the first entrance is formed as a second inclined surface that is inclined with respect to the direction in which the side pin is inserted.

6. The windshield wiper assembly according to claim 4, wherein a surface of the first catching end that is brought into contact with the side pin inserted into the coupling recess is formed as a horizontal surface that is perpendicular to a direction in which the side pin is inserted, and a surface of the second catching end that is brought into contact with the side pin inserted into the coupling recess is formed as a curved surface corresponding to an outer surface of the side pin.

7. The windshield wiper assembly according to claim 1, wherein the adaptor holder is provided with an elastic catching part, an upper side of which is open, and the adaptor is provided with a boss, which is inserted into the elastic catching part of the adaptor holder.

8. A windshield wiper assembly comprising:
a wiping rubber member configured to be brought into contact with a windshield of a vehicle;
a spoiler for supporting the wiping rubber member and enabling the wiping rubber member to be brought into tight contact with the windshield by pressure of wind applied while the vehicle is being driven;
an adaptor holder coupled to a middle portion of the spoiler in a longitudinal direction for supporting the spoiler; and
an adaptor rotatably coupled to the adaptor holder, the adaptor being connected to a driving arm equipped in the vehicle, wherein the adaptor is provided with a first coupling part, into which a side pin protruding from a side surface of the driving arm is inserted, and a first entrance of the first coupling part, into which the side pin is inserted, is open upward, wherein a partition wall, to which the adaptor holder is coupled, is formed in a lower side of a recess formed by cutting a portion of an upper side of the middle portion of the spoiler in the longitudinal direction, the partition wall is provided at one end thereof with a first opening hole, into which the adaptor holder is coupled, and at the other end thereof with a second opening hole, into which the adaptor holder is coupled, and a portion of the partition wall other than the first opening hole and the second opening hole partitions the recess and an inner space of the spoiler from each other.

9. The windshield wiper assembly according to claim 8, wherein the adaptor holder is provided at one end thereof with a catching protrusion, which is inserted into the first opening hole, the catching protrusion protruding in the longitudinal direction, and at the other end thereof with a first elastic catching part, which is inserted into the second opening hole, the first elastic catching part protruding downward.

10. The windshield wiper assembly according to claim 9, wherein a lower side of the first elastic catching part is open, and the spoiler is provided with a first boss, which is formed at a lower side of the second opening hole such that the first boss is inserted into the first elastic catching part.

11. The windshield wiper assembly according to claim 9, wherein the partition wall comprises:
a straight part extending straight in the longitudinal direction;
a first curved part extending from one end of the straight part in the longitudinal direction, the first curved part being curved at a predetermined curvature such that the first curved part protrudes upward; and
a second curved part extending from the other end of the straight part in the longitudinal direction, the second curved part being curved at a predetermined curvature such that the second curved part protrudes upward.

12. The windshield wiper assembly according to claim 11, wherein the adaptor holder comprises:
a base part extending straight in the longitudinal direction so as to correspond to the straight part;
a third curved part extending from one end of the base part in the longitudinal direction so as to correspond to the first curved part, the third curved part being curved at a predetermined curvature such that the third curved part protrudes upward; and
a fourth curved part extending from the other end of the base part in the longitudinal direction so as to correspond to the second curved part, the fourth curved part being curved at a predetermined curvature such that the fourth curved part protrudes upward.

13. A windshield wiper assembly comprising:
a wiping rubber member configured to be brought into contact with a windshield of a vehicle;
a spoiler for supporting the wiping rubber member and enabling the wiping rubber member to be brought into tight contact with the windshield by pressure of wind applied while the vehicle is being driven;
an adaptor holder coupled to a middle portion of the spoiler in a longitudinal direction for supporting the spoiler; and
an adaptor rotatably coupled to the adaptor holder, the adaptor being connected to a driving arm equipped in the vehicle, wherein the adaptor is provided with a first coupling part, into which a side pin protruding from a side surface of the driving arm is inserted, and a first entrance of the first coupling part, into which the side pin is inserted, is open upward,
wherein, on a cross section across the longitudinal direction, the spoiler comprises:
a first side surface, on an upper part of which a first wind pressure application surface is formed, the first wind pressure application surface being concave, the first side surface defining one side surface of the spoiler;
a second side surface, on an upper part of which a second wind pressure application surface is formed, the second wind pressure application surface being concave, the second side surface defining the other side surface of the spoiler, the second side surface being spaced apart from the first side surface;
an upper surface defining an upper surface of the spoiler, the upper surface being flat;
a first connection surface connecting one side of the upper surface and an upper side of the first wind pressure application surface to each other, the first connection surface being convex; and
a second connection surface connecting the other side of the upper surface and an upper side of the second wind pressure application surface to each other, the second connection surface being convex.

14. The windshield wiper assembly according to claim 13, wherein the spoiler is provided with a recess, which is formed by cutting a portion of an upper side of the middle portion of the spoiler in the longitudinal direction, the first wind pressure application surface, the second wind pressure application surface, the upper surface, the first connection surface, and the second connection surface extend from opposite ends of the recess in the longitudinal direction, a distance between the first wind pressure application surface and the second wind pressure application surface is gradually increased toward an upper side of the spoiler and is gradually decreased toward a lower side of the spoiler, and a width and height of the upper surface are gradually decreased toward the lower side of the spoiler.

* * * * *